US009985982B1

(12) United States Patent
Bartos et al.

(10) Patent No.: US 9,985,982 B1
(45) Date of Patent: May 29, 2018

(54) METHOD AND APPARATUS FOR AGGREGATING INDICATORS OF COMPROMISE FOR USE IN NETWORK SECURITY

(71) Applicant: CISCO TECHNOLOGY, INC., San Jose, CA (US)

(72) Inventors: Karel Bartos, Prague (CZ); Michal Sofka, Prague (CZ); Vojtech Franc, Roundnice nad Labem (CZ); Jiri Havelka, Rudna (CZ)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 14/977,444

(22) Filed: Dec. 21, 2015

(51) Int. Cl.
*H04L 29/06* (2006.01)

(52) U.S. Cl.
CPC .......... *H04L 63/1425* (2013.01); *H04L 63/20* (2013.01)

(58) Field of Classification Search
CPC ... G06F 21/50; G06F 21/60; H04L 29/06877; H04L 29/06884; H04L 63/1425; H04L 63/20
See application file for complete search history.

(56) References Cited

U.S. PATENT DOCUMENTS

| | | | | |
|---|---|---|---|---|
| 8,401,982 B1 * | 3/2013 | Satish | ................... | G06F 21/566 706/12 |
| 8,468,602 B2 * | 6/2013 | McDougal | ............ | G06F 21/562 726/22 |
| 8,863,279 B2 | 10/2014 | McDougal et al. | | |
| 9,148,442 B2 | 9/2015 | Kraemer et al. | | |
| 9,386,030 B2 * | 7/2016 | Vashist | ............... | H04L 63/1416 |
| 2009/0049549 A1 * | 2/2009 | Park | ........................ | G06F 21/55 726/22 |
| 2009/0138590 A1 * | 5/2009 | Lee | ........................ | H04L 43/045 709/224 |
| 2010/0153785 A1 * | 6/2010 | Keromytis | .............. | G06F 11/08 714/38.11 |
| 2011/0283361 A1 * | 11/2011 | Perdisci | .................. | G06F 21/56 726/24 |
| 2014/0041032 A1 * | 2/2014 | Scheper | .................. | H04L 63/14 726/23 |
| 2014/0201836 A1 | 7/2014 | Amsler et al. | | |
| 2015/0020199 A1 * | 1/2015 | Neil | ..................... | H04L 63/1433 726/23 |
| 2015/0128263 A1 * | 5/2015 | Raugas | ............... | H04L 63/1408 726/23 |
| 2015/0180890 A1 * | 6/2015 | Ronen | ..................... | G06F 21/56 726/23 |
| 2015/0186669 A1 * | 7/2015 | Nicolaou | ............ | G06F 21/6218 726/4 |
| 2015/0326600 A1 * | 11/2015 | Karabatis | ............ | H04L 63/1433 726/25 |

* cited by examiner

*Primary Examiner* — Hadi S Armouche
*Assistant Examiner* — Sher A Khan
(74) *Attorney, Agent, or Firm* — Cindy Kaplan

(57) ABSTRACT

In one embodiment, a method includes receiving at a security analysis device a plurality of indicators of compromise (IOCs) associated with an entity, sorting at the security analysis device, the IOCs based on a time of occurrence of each of the IOCs, creating a representation of transitions between the IOCs at the security analysis device, and generating at the security analysis device, a feature vector based on the representation of transitions. The feature vector is configured for use by a classifier in identifying malicious entities. An apparatus and logic are also disclosed herein.

19 Claims, 8 Drawing Sheets

METHOD AND APPARATUS FOR AGGREGATING INDICATORS OF COMPROMISE FOR USE IN NETWORK SECURITY

TECHNICAL FIELD

The present disclosure relates generally to communication networks, and more particularly, to network security.

BACKGROUND

Computer networks are exposed to a variety of different attacks that expose vulnerabilities of computer systems in order to compromise their security. Advanced security threats may be designed to quietly infiltrate targeted hosts and perform tasks in a stealth mode with minimal exposure to detection systems. Security systems are challenged with defending against these threats because their security technologies may not provide visibility necessary to quickly detect and eliminate threats before damage can be done.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
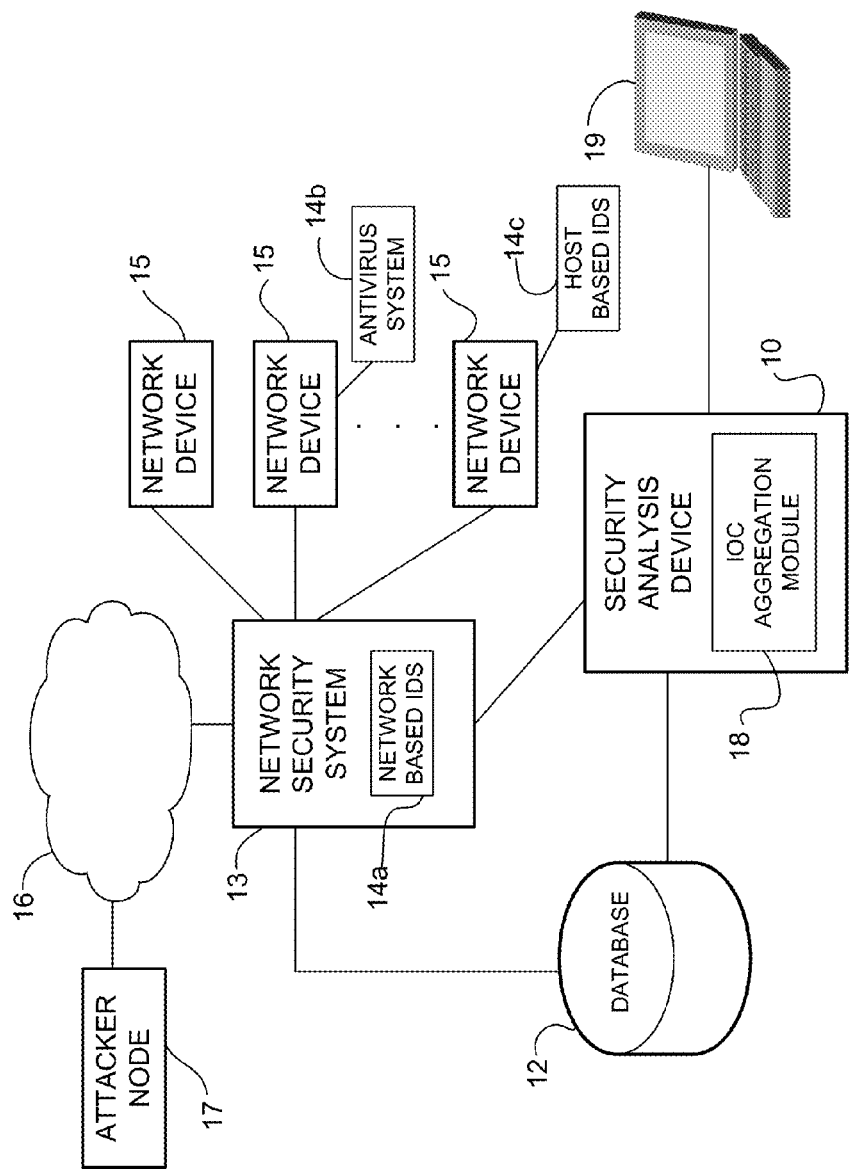
FIG. 1 illustrates an example of a network in which embodiments described herein may be implemented.

In one embodiment, a method generally comprises receiving at a security analysis device a plurality of indicators of compromise (IOCs) associated with an entity, sorting at the security analysis device, the IOCs based on a time of occurrence of each of the IOCs, creating a representation of transitions between the IOCs at the security analysis device, and generating at the security analysis device a feature vector based on the representation of transitions. The feature vector is configured for use by a classifier in identifying malicious entities.

In another embodiment, an apparatus generally comprises an interface for receiving a plurality of indicators of compromise (IOCs) associated with an entity, a processor for sorting the IOCs based on a time of occurrence of each of the IOCs, creating a representation of transitions between the IOCs, and generating a feature vector based on the representation of transitions. The apparatus further comprises memory for storing the IOCs. The feature vector is configured for use by a classifier in identifying malicious entities.

In yet another embodiment, logic is encoded on one or more non-transitory computer readable media for execution and when executed operable to process a plurality of indicators of compromise (IOCs) associated with an entity, the IOCs received from multiple security devices, at least two of the security devices operable to produce different types of IOCs, sort the IOCs based on a time of occurrence of each of the IOCs, create a representation of transitions between the IOCs, and generate a feature vector based on the representation of transitions. The feature vector is configured for use by a classifier in identifying malicious entities.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In order to avoid detection, sophisticated malware may not perform all tasks as a single action, but instead decompose the tasks into several actions executed one-by-one over time. In some cases, it may also not be possible to achieve malware's malicious intent within a single action. Some of these actions may be detected as indicators of compromise (IOCs). Importantly, one indicator itself does not necessarily imply a security threat. It is typically a sequence in time of such indicators that can be assigned to malicious behavior. Multiple security systems may be relied on, since the obtained IOCs use different techniques on different sources of data. A drawback with conventional systems is that a final conclusion based on individual findings of all systems has to be made manually, which increases the costs and decreases the number of resolved incidents.

The embodiments described herein may be used to automatically combine IOCs to yield a precise and complete set of reported incidents. Malicious behaviors may be monitored and analyzed with a variety of detection and classification systems and IOCs evaluated across all of these systems. Combining diverse security systems complements individual findings, which leads to better efficacy and more extensive and explanatory descriptions of network threats since a complete attack vector can be reconstructed from all IOCs.

Referring now to the drawings, and first to FIG. 1, an example of a network in which embodiments described herein may be implemented is shown. For simplification only a small number of nodes are shown. The network includes a security analysis device 10, which receives data from a database 12, network security (detection) system 13, security (detection) device 14*a*, 14*b*, 14*c*, or any combination thereof. The network may comprise any number of network devices 15 (e.g., hosts, endpoints, user devices, servers, clients, computers, laptops, tablets, mobile devices, or other devices) in communication via any number of nodes (e.g., routers, switches, controllers, gateways, access layer devices, aggregation layer devices, edge devices, core devices, or other network devices (not shown)), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network). Network traffic may also travel between a main campus and remote branches or any other networks. The network security system 13 may manage security aspects of communications between the network devices 15 and an untrusted network 16. In the example shown in FIG. 1, the security analysis device 10 is in communication with a computer 19 (e.g., administrator computer) that may be used to retrieve information or reports about security threats.

The network security system 13 may comprise, for example, a firewall or other device operable to control network traffic by applying a set of rules to traffic, thus limiting traffic flow between trusted network devices 15 and untrusted external network 16. The network security system 13 may also comprise a gateway, proxy, or other network device operable to collect network performance data for traffic exchanged between network devices 15 and external network 16. Network performance data may include information about communications between devices, clients, users, subnetworks, and the like. Network performance data may also include information specific to file transfers initiated by the devices 15, exchanged emails, retransmitted files, registry access, file access, network failures, device failures, and the like. Other data such as bandwidth, throughput, latency, jitter, and error rate may also be collected by the network security system 13. The network security system or other network traffic collection system may be distributed throughout the network or operate at one or more network devices (e.g., firewall, gateway, proxy, threat prevention appliance, etc.). For example, the network security system 13 may comprise one or more proxy devices operable to collect network traffic data and forward to the security analysis device 10.

The network security system 13 may also comprise any number of individual security devices including, for example, a network-based IDS (Intrusion Detection System) 14a located at network security system 13 or another network device, anti-virus system 14b located at one or more of the network devices 15, host-based IDS 14c located at one or more of the network devices, or any other security device or system (e.g., anomaly detection system, IPS (Intrusion Prevention System), pattern-matching device, signature-based detection system, antivirus software or system, systems using static or dynamic analysis, Cisco Advanced Malware Protection (AMP), AMP Threat Grid, Cognitive Threat Analytics (CTA), or any other detection device, malware analysis device, or threat intelligence device).

The network security devices 14a, 14b, 14c may be associated with a central security device (e.g., network security system 13 operating as a distributed security system) or operate independently from one another with different data collection means or analysis logic. For example, two or more of the security devices 14a, 14b, 14c may be diverse (i.e., process different data or produce different types of IOCs). The security devices 14a, 14b, 14c may input data directly to the security analysis device 10, database 12, or network security system 13. The security analysis device 10 may also provide information on security threats to one or more of the security devices 14a, 14b, 14c or security system 13 within the network or located in another network. The network may include any number of security devices or systems.

The security system 13 or devices 14a, 14b, 14c may monitor data traffic and determine whether any malicious activities or policy violations occurred in the network in order to identify IOCs. The IOCs may be based, for example, on system events (e.g., updates, logins, usage), network traffic classifications (e.g., DGA (Domain Generation Algorithm), tunneling data, video streaming), or malware artifacts (e.g., static analysis, registry activity, file activity). The IOCs may include, for example, virus signatures and IP (Internet Protocol) addresses, hashes of malware files, URLs or domain names of command and control servers, or events (e.g., downloading a suspicious file, communication with an algorithmically generated domain, change in registry, failed login, executing malicious binary code, key capturing), or any other artifact, process, or action that may indicate a threat, attack, computer intrusion, or other malicious behavior. As described in detail below, IOCs associated with an entity are aggregated for use in malware classification to provide early detection of future attack attempts using intrusion detection systems and antivirus software, for example. The IOCs may be stored in one or more IOC databases 12.

The database 12 may be a central storage device or a distributed storage system. The database 12 may also be located at the security analysis device 10. The database 12 may have a particular database schema or comprise a file system with one or more structured data files that may have various formats or schemas. The database 12 may include for example, network performance data, number of bytes transferred, URLs (Uniform Resource Locators), IP addresses, HTTP (Hypertext Transfer Protocol) status, registry access, file system access, or any other data that may be collected by the network security system 13, security devices 14a, 14b, 14c, or other collection device. As described below, the database 12 may store IOCs associated with one or more entity and a time of occurrence for each IOC. IOCs may be stored for any period of time (e.g., up to 45 days (or more or less time)) depending on the amount of available storage and number of entities monitored.

As shown in FIG. 1, one or more attacker nodes (entities) 17 (e.g., malicious site, source, device, user, command and control server, or group of devices) may be in communication with network 16. The attacker node 17 may, for example, launch a malware attack on one or more network devices 15 (attacked nodes) via network 16. The attacker node 17 may be any type of entity capable of launching a cyber-attack and may include, for example, a physical device, computer user, computer domain, computer network, computer sub-network, and the like. Information about attack incidents may be collected and processed by the network security system 13, security devices 14a, 14b, 14c, or security analysis device 10. In one example, an attacked node 15 (or security device 14b, 14c at attacked node) may detect an incident, collect information about the incident, create a record that contains one or more characteristics of the incident, and transmit the incident data record to the security system 13 or security analysis device 10.

The term "entity" as used herein may refer to a user (e.g., client identifier, user identifier, or other identifier) or a machine (e.g., host, endpoint, server, network device). The term "malicious entity" as used herein may refer to any user or device exhibiting malicious behavior or source (e.g., user, device) of malicious network traffic or security threat (e.g., program, application, software, or other executable instructions or code).

The security analysis device 10 may be any computer or network device (e.g., server, controller, appliance, management station, or other processing device, network element, or general purpose computing device), which may be located in a network or a cloud environment. The security analysis device 10 may also be located at the security system 13, security device 14*a*, 14*b*, 14*c*, or distributed among two or more network devices. The security analysis device 10 may, for example, learn what causes security violations by monitoring and analyzing behavior and events that occur prior to the security violation taking place, in order to prevent such events from occurring in the future. As described further below, the security analysis device 10 may generate vectors that represent IOC transitions of an entity for use by a classifier. The classifier may be, for example, a data-driven classifier (e.g., SVM (Support Vector Machine)) or any other classifier that may be used to automatically separate and report entities, whose sequences of IOCs represent malicious behavior (malicious entities). The classifier may be located at the security analysis device 10 or another network device.

In one embodiment, the security analysis device 10 includes an IOC aggregation module 18 configured to process data received from the database 12, network security system 13, security devices 14*a*, 14*b*, 14*c*, or any other network device. As described in detail below, the IOC aggregation module 18 may provide a data-driven approach for combining IOCs reported from the security system 13, security devices 14*a*, 14*b*, 14*c*, or any combination thereof. The IOC aggregation module 18 may combine IOCs from one or more security devices, including multiple diverse devices regardless of what data they process or what types of IOCs they produce. Aggregation of IOCs across security devices yields higher efficacy and reduces costs associated with manual analysis.

In one embodiment, the security analysis device 10 may provide a complete report with reconstructed attack vectors from multiple security devices. As described below, the IOCs may be transformed into a representation that describes individual transitions and inner dependencies among the indicators to reconstruct the possible attack vector. The security analysis device 10 may be used to make a decision whether to trigger a security alert for a particular entity based on the analysis of a set of IOCs associated with the entity. As previously noted, the IOCs may be acquired from one or multiple diverse security devices. Even though the IOCs produced by these security devices may be completely diverse, the embodiments provide a way to perform intelligent reasoning about the IOCs. Results from the IOC aggregation module 18 may be provided to a classifier. A data-driven classifier trained on IOC transition representations described herein (e.g., feature vectors generated from transition matrices) may use much more information about the possibly-infected entities as compared to analysis from a single security device, and may be better equipped to automatically make final decisions without any manual intervention by security administrators.

It is to be understood that the network shown in FIG. 1 and described above is only an example and that the embodiments described herein may be implemented in networks having different network topologies or network devices, without departing from the scope of the embodiments. For example, the IOC aggregation module 18 may be installed in any computer operable to receive data from one or more sources and generate information for use in classifying entities as malicious or legitimate. The network may include any number or type of network devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, accelerators, virtual machines, switches, routers, appliances, controllers, or other nodes interconnected to form a large and complex network, which may include cloud or fog computing. Nodes may be coupled to other nodes through one or more interfaces employing any suitable wired or wireless connection, which provides a viable pathway for electronic communications.

Figure 2:
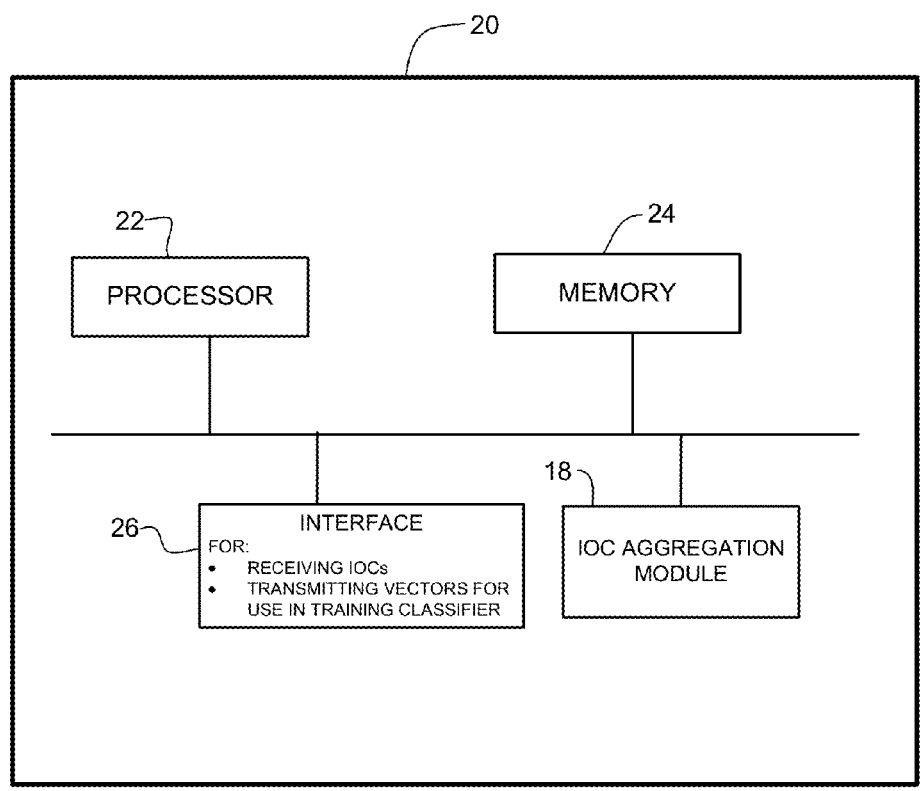
FIG. 2 depicts an example of a network device useful in implementing embodiments described herein.

FIG. 2 is a block diagram illustrating an example of a network device 20 (e.g., security analysis device 10 in FIG. 1) that may be used to implement embodiments described herein. The network device 20 is a programmable machine that may be implemented in hardware, software, or any combination thereof. The network device 20 includes a processor 22, memory 24, interface 26, and the IOC aggregation module 18 (e.g., software, firmware, code, logic).

Memory 24 may be a volatile memory or non-volatile storage, which stores various applications, modules, and data for execution and use by the processor 22. Memory 24 may store, for example, one or more components of the IOC aggregation module 18 or comprise one or more databases for storing IOCs.

Logic may be encoded in one or more tangible computer readable media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interface 26 may comprise any number of interfaces (linecards, ports) for receiving data or transmitting data to other devices. For example, the interface 26 may be operable to receive IOCs from one or more security devices and transmit vectors (e.g., feature vectors, binarized feature vectors (described below)) for use by a classifier. As noted above, the classifier may be located at the security analysis device 10, in which case the feature vector is transmitted to the classifier on an internal interface. The network interface 26 may include, for example, an Ethernet interface for connection to a computer or network. The network interface 26 may be configured to transmit or receive data using a variety of different communication protocols. The interface 26 may include mechanical, electrical, and signaling circuitry for communicating data over physical links coupled to the network.

It is to be understood that the network device 20 shown in FIG. 2 and described above is only an example and that different configurations or types of components or elements may be used. For example, the network device 20 may further include any suitable combination of hardware, software, algorithms, processors, devices, components, modules, or elements operable to facilitate the capabilities described herein.

Figure 3:
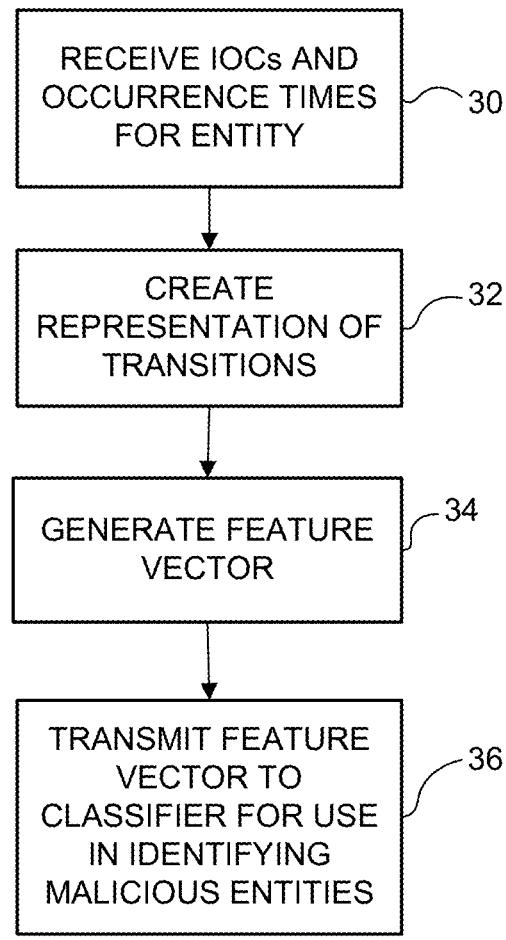
FIG. 3 is a flowchart illustrating a process for IOC (Indicator of Compromise) aggregation, in accordance with one embodiment.

FIG. 3 is a flowchart illustrating an overview of a process for IOC aggregation, in accordance with one embodiment. At step 30 the security analysis device 10 receives IOCs for an entity from one or more security devices (e.g., security system 13, security devices 14a, 14b, 14c) and a time of occurrence for each of the IOCs (FIGS. 1 and 3). The security analysis device 10 uses the IOCs to create a representation of transitions between IOCs (step 32). In one example, the IOCs may be sorted based on their time occurrence and transitions between IOCs used to create a transition matrix. A feature vector is generated based on the representation of transitions (step 34). The feature vector may be a binarized feature vector as described below with respect to FIG. 4 or any other representation of the IOCs and their inner dependencies. The feature vector may be transmitted to a classifier for use in training the classifier to report entities whose sequences of IOCs represent malicious behavior (step 36).

It is to be understood that the process illustrated in FIG. 3 and described above is only an example and that steps may be added or modified without departing from the scope of the embodiments. Also, it may be noted that the processor 22 or the IOC aggregation module 18 shown in FIG. 2 (or a combination thereof) may implement one or more of the steps shown in FIG. 3 and described herein. For example, logic encoded on a computer readable media and executed by the processor 22 may be operable to perform one or more steps shown in FIG. 3 and described above.

The following examples first describe construction of representations of IOC transitions with IOCs from a single security (detection) system. As described in the following examples, this may be extended to multiple diverse security (detection) devices.

In one embodiment, a set of IOCs may be created as an output of a single detection system, either in a streaming or batch mode. These IOCs may be transmitted to the IOC database 12 as shown in FIG. 1, for example. The database 12 accumulates IOCs for each entity 17 (user, machine) together with a time of occurrence for each IOC. When a new IOC of an entity is detected, the database 12 is updated and the IOC is stored alongside the previous IOCs of the corresponding entity 17. After the database 12 is updated, all IOCs related to the entity are combined (aggregated) for use in computing a representation of transitions between the IOCs. In one embodiment, the representation of transitions comprises a transition matrix computed separately for each entity, where rows and columns of the matrix correspond to individual IOCs. The IOCs of the entity may be sorted based on their time of occurrence, from oldest to latest, for example. The sorted (chained) IOCs are used to compute the transition matrix. A feature vector may then be generated based on the representation of IOC transitions. In one example, the feature vector is generated from rows of the transition matrix. The term "feature vector" as used herein may refer to any data representing IOCs associated with an entity and inner dependencies among the IOCs (e.g., transitions), which may be used by a classifier (e.g., for training a classifier to identify malicious entities).

Figure 4:
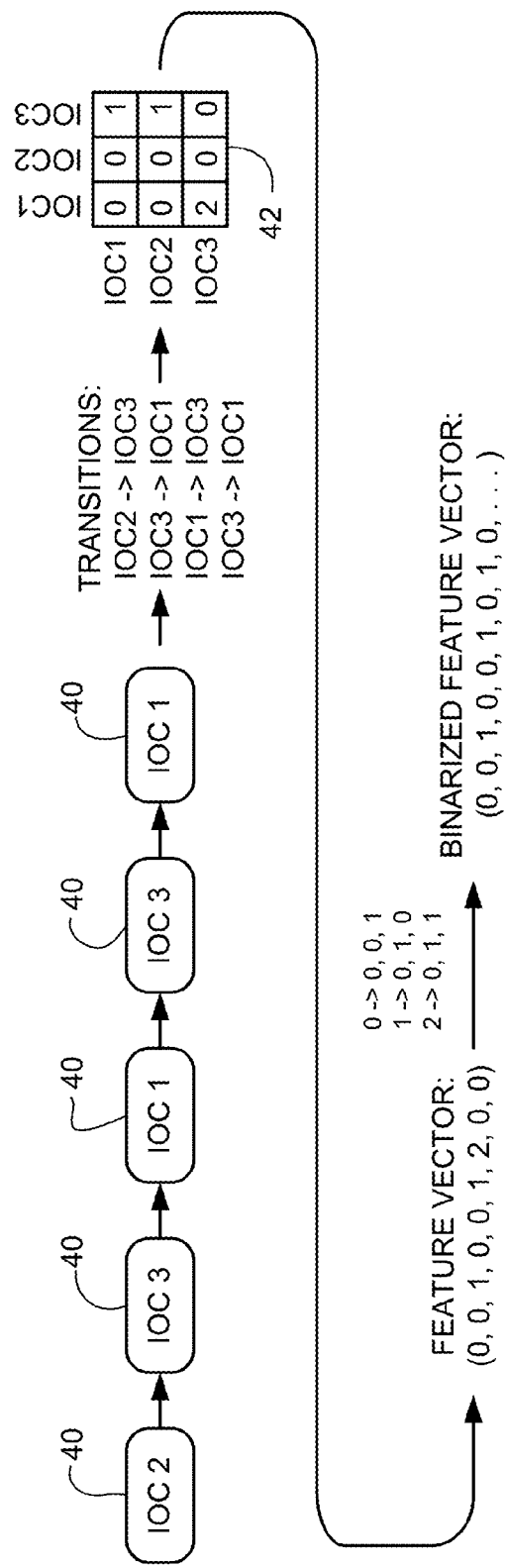
FIG. 4 illustrates a process for generating a feature vector representing first-order IOC transitions for an entity, in accordance with one embodiment.
Figure 5:
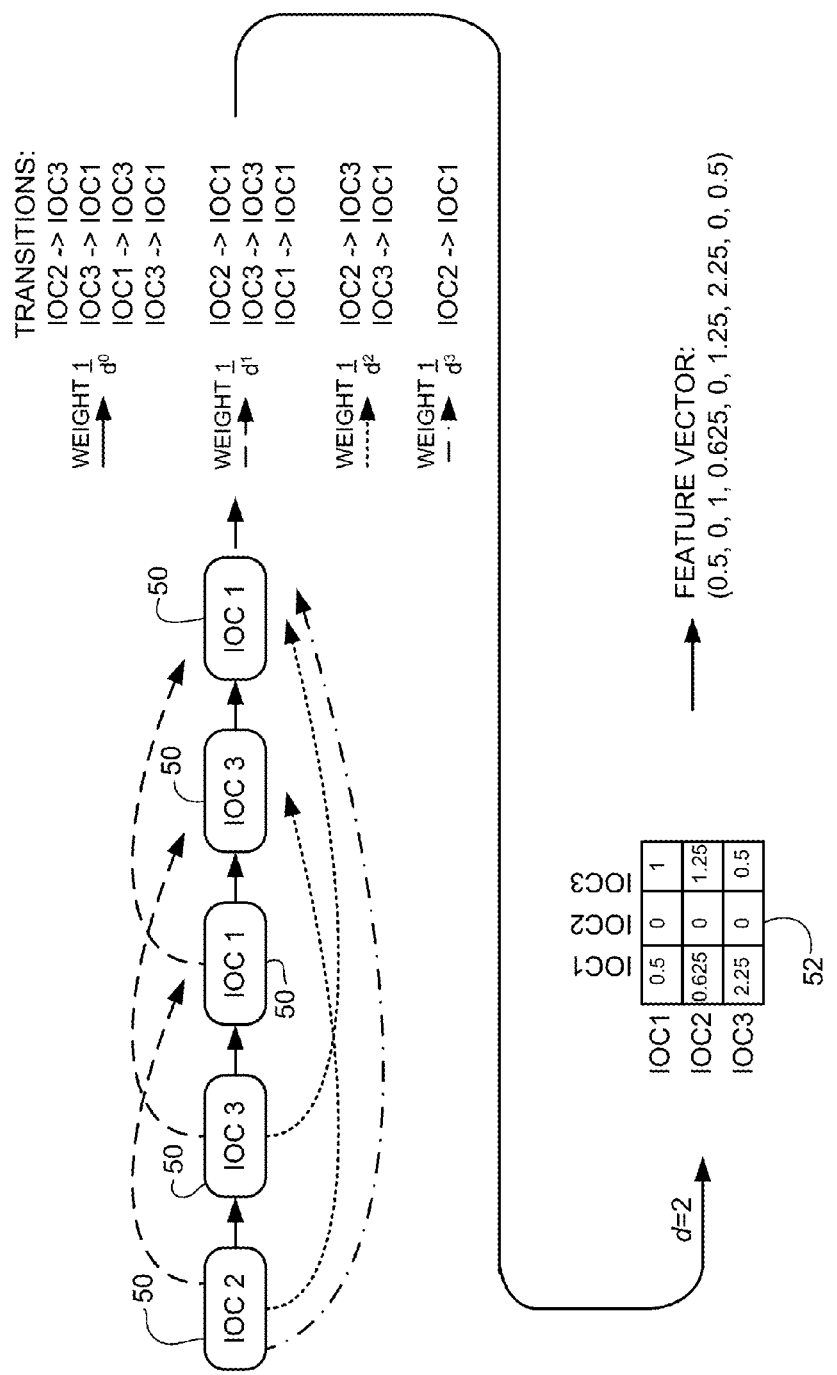
FIG. 5 illustrates a process for generating a feature vector representing multi-order IOC transitions for an entity, in accordance with one embodiment.

The following describes examples of two transition models, with computations for each shown in FIGS. 4 and 5.

The transition model shown in FIG. 4 is a binarized first-order transition model. The IOCs 40 are first sorted based on their time of occurrence. Transitions are computed for all pairs of consecutive IOCs 40 (e.g., IOC 2 and IOC 3, IOC 3 and IOC 1, IOC 1 and IOC 3, IOC 3 and IOC 1). Next, the corresponding transitions are extracted, forming a transition matrix 42. Each transition is recorded in the transition matrix 42, where an i,j-th element denotes the number of transitions from i-th IOC to j-th IOC. In the case of first-order representation, only consecutive transitions are considered. In the example shown in FIG. 4, there is one transition from IOC 1 to IOC 3, thus row 1, column 3 of the transition matrix contains a 1. There are no transitions from IOC 2 to IOC 1, thus row 2, column 1 contains a 0. There are two transitions from IOC 3 to IOC 1, thus row 3, column 1 contains a 2. Finally, the feature vector is extracted from rows of the transition matrix 42. In the example shown in FIG. 4, rows of the transition matrix 42 form feature vector (0, 0, 1, 0, 0, 1, 2, 0, 0). The feature vector may be binarized to speed-up a training (learning) process for the classifier. The binarized feature vector (0, 0, 1, 0, 0, 1, 0, 1, 0, . . . ) is formed by converting 0→0, 0, 1; 1→0, 1, 0; and 2→0, 1, 1 so that the binarized feature vector includes only zeros and ones.

The transition model shown in FIG. 5 is a multi-order transition model. Transitions are computed for all pairs of IOCs 50 and weighted according to the distance between IOCs. As the distance between the IOCs increases, the weight decreases exponentially with a predefined coefficient d. In one embodiment for multi-order representation, all transitions are considered and weighted exponentially. In the example shown in FIG. 5, a first set of transitions (with distance between IOCs equal to 1) is weighted according to $$\frac{1}{d^0},$$

a second set (distance equal to 2) weighted according to $$\frac{1}{d^1},$$

a third set (distance equal to 3) weighted according to $$\frac{1}{d^2},$$

and a fourth set (distance equal to 4) weighted according to $$\frac{1}{d^3},$$

with coefficient d equal to 2. These weighted transitions result in the transition matrix 52 shown in FIG. 5. The feature vector (0.5, 0, 1, 0.625, 0, 1.25, 2.25, 0, 0.5) is extracted from rows of the transition matrix 52. It is to be understood that the weights and coefficient used in FIG. 5 are only examples and that other weights and coefficients may be used without departing from the scope of the embodiments.

In another embodiment, first-order and multi-order representations of transitions described above with respect to FIGS. 4 and 5, respectively, may be combined to improve the transition representation.

Figure 6:
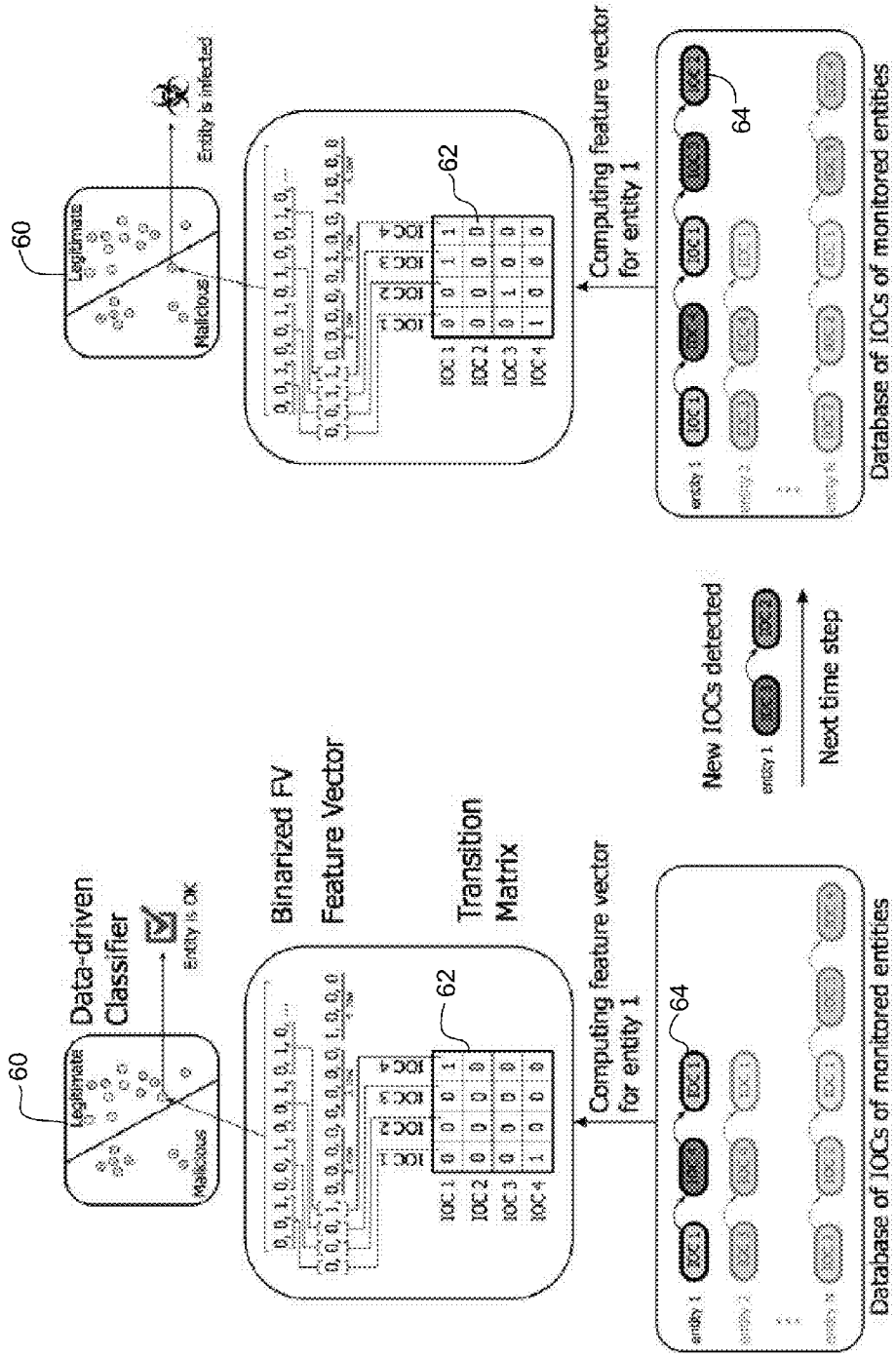
FIG. 6 illustrates a process for classifying entities, in accordance with one embodiment.

The following describes an example for training and classification of a data-driven classifier. FIG. 6 illustrates an example of a process for classifying entities (users, devices) with the proposed first-order representation of transitions (described above with respect to FIG. 4). It is to be understood that the multi-order representation of transitions shown in FIG. 5 may also be used. As shown in FIG. 6, the representation of IOC transitions may be used to train a data-driven classifier 60 (e.g. SVM (Support Vector Machine)). Positive and negative feature vectors may be obtained from the training data.

The following describes an example of a training procedure with reference to FIG. 6. First, each system (security device) is evaluated on the training data separately to create a set of IOCs 64. During the classification process, one or more security devices produce a set of IOCs for each entity separately. The IOCs for each entity are grouped together and chained based on their starting time, as previously described. In this example, the first in the chain is the IOC that occurred first. Next, the IOCs are combined and the transition matrices and feature vectors computed, as described above. As shown in FIG. 6, the transition matrix 62 for entity 1 is computed from the chain of IOCs 64, which is further transformed into a single feature vector. For each entity (entity 1, entity 2, . . . entity 3), a transition matrix is computed from consecutive groups of IOCs. The matrix 62 may then be vectorized and binarized, as previously described.

The IOC transition counts as represented by feature vectors may be used directly to train the data-driven classifier 60. The counts may also be binarized to make the optimization during training easier (as in SVM classification). In this case, N equidistant bins between the minimal and maximal value of the count over all transition matrices may be created independently for each transition value. Once the classifier 60 is trained, it may be applied to real network traffic to identify infected entities. The classifier 60 may then determine whether an entity with such feature vector is infected.

The feature vector may be used, for example, for a classification task at the classifier 60, where positive samples belong to malicious behaviors. The feature vectors of entities marked as malicious are positive and the rest are considered negative. The classifier 60 is trained based on these positive and negative feature vectors. In the example shown in FIG. 6, entity 1 is first classified as legitimate (based on the chain of IOCs 64 (IOC 1, IOC4, IOC1)). In a next time step, two new IOCs (IOC 3, IOC 2) are received from a detection system. These two IOCs are chained with the previous three IOCs to form chain IOC 1, IOC 4, IOC 1, IOC 3, IOC2, and a new set of transitions is computed. As shown in FIG. 6, this new set of transitions is marked as positive (vector identified as malicious), indicating that the entity is infected. The feature vector may be updated periodically (e.g., every five minutes or any other time interval) or upon receipt of one or a specified number of new IOCs for the entity.

Since the classifier is data-driven, it can easily be retrained with a few up-to-date malware samples to be able to react on the changes of threat landscape. With more information available, the classifier 60 is able to not only reduce the amount of false positives, but also increase the number of detected malicious samples by correlating weak IOCs from multiple devices.

Figure 7:
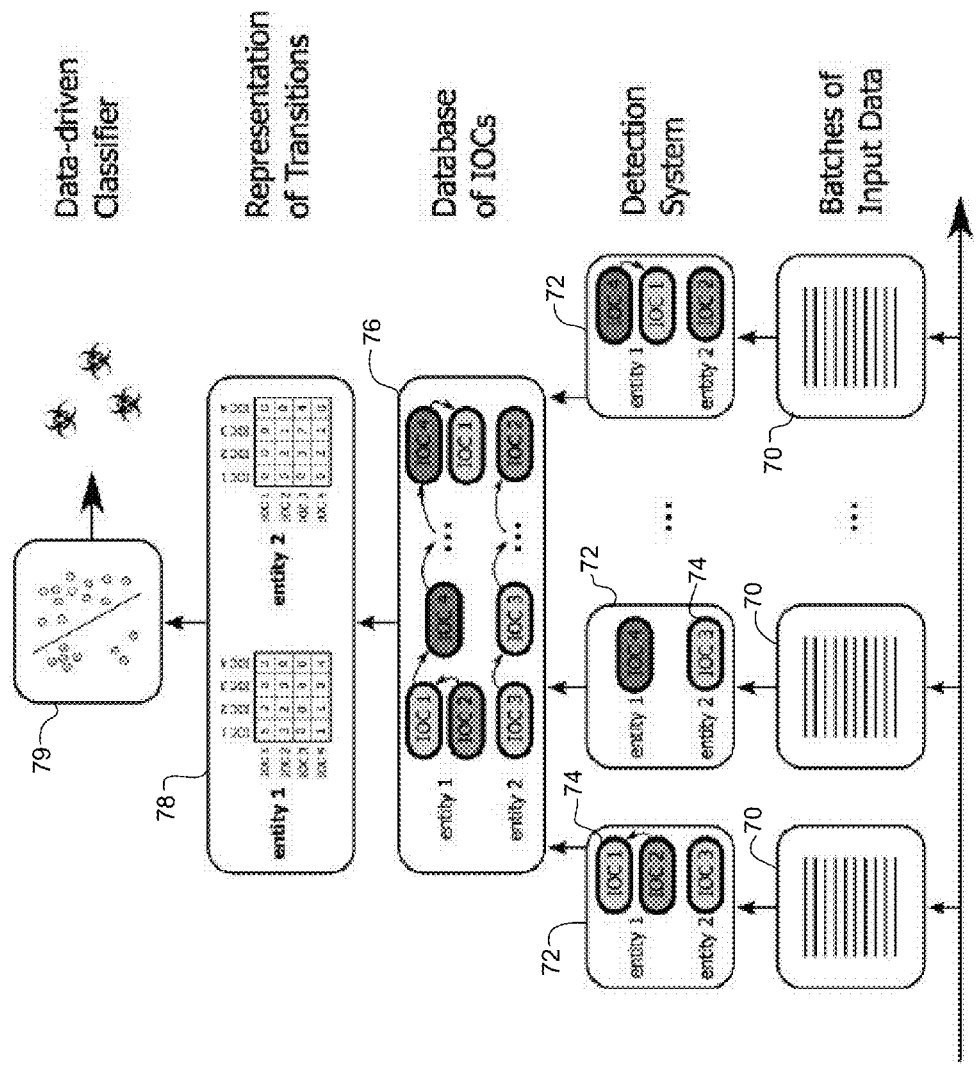
FIG. 7 illustrates IOC aggregation with a detection system processing data in batches, in accordance with one embodiment.

The embodiments described herein may be easily integrated with existing security systems, such as network-based or host-based Intrusion Detection Systems, signature-based detection systems, pattern-matching devices, antivirus systems, and the like. An example of integration with a batch processing system is illustrated in FIG. 7 and described below. It may be noted that integration of the embodiments with a system processing streaming data is analogical.

FIG. 7 illustrates integration with a single detection system 72 processing data in batches 70. The detection system 72 analyzes incoming traffic and reports individual IOCs 74 over time. The reported IOCs are stored in a database 76. IOCs associated with the same entity and that occurred close to each other are grouped together. Representations of IOC transitions are computed from IOC groups and a classifier 79 may be used to make final decisions as to whether an entity with a given series of IOCs is infected by malware. The embodiments may also provide details as to why decisions were made in a full report with IOC dependencies so that an administrator or operator can review the data.

The following describes IOC aggregation with IOCs received from multiple diverse security devices. Use of input from multiple security devices may provide more precise and robust threat detection. When multiple security devices are used to provide diverse IOCs, the database of IOCs is shared across all devices regardless of what type of data is processed or what types of IOCs are produced. There are only two common attributes; entity and time, which should both be defined consistently across all security devices. This constraint is easily fulfilled in practice.

Figure 8:
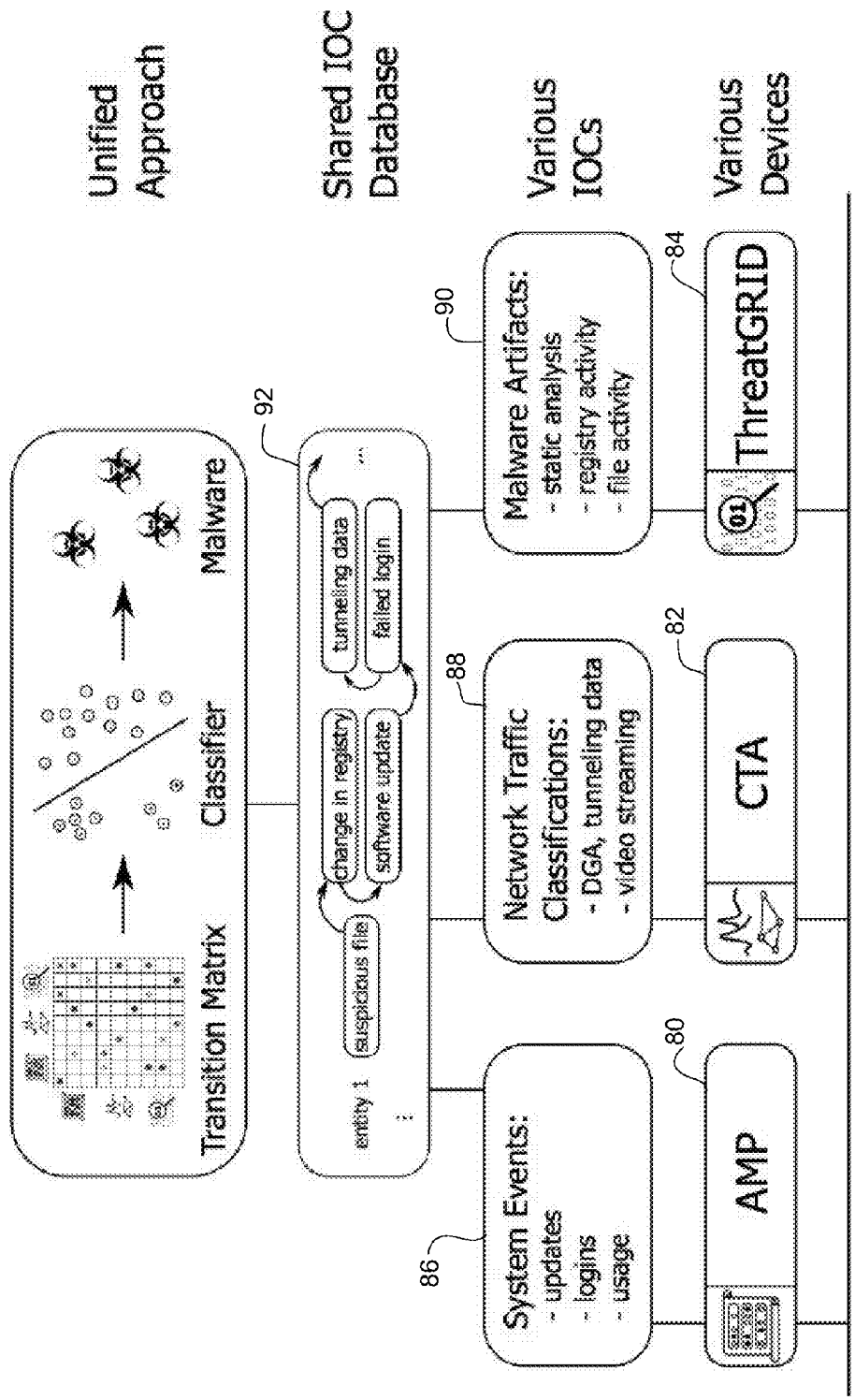
FIG. 8 illustrates IOC aggregation with multiple security devices, in accordance with one embodiment.

FIG. 8 illustrates one embodiment in which IOCs are received from three diverse security devices 80, 82, 84. In this example, the security devices comprise Advanced Malware Protection (AMP), Cognitive Threat Analytics (CTA), and Threat Grid. It is to be understood that these are only examples and that other types of security devices or platforms may be used. Each security device 80, 82, 84 is configured to detect a specific set of IOCs 86, 88, 90, respectively. These IOCs are combined in a shared database 92 and a transition matrix is created for each monitored entity, as previously described. The transition matrix expresses correlation among all IOCs reported by all three devices. A data-driven classifier may be used to automatically separate and report entities whose sequences of IOCs may represent malicious behaviors.

As can be observed from the foregoing, the embodiments described herein provide numerous advantages. One or more embodiments may be built on top of a security device and model all IOCs reported by the device. This results in better efficacy then by triggering a security alert after every raised IOC. With the transition matrix and proposed representation, one or more embodiments provide an intelligent, automatic, and effective means for analyzing IOCs, so that a network administrator is not overwhelmed with finding relations and dependencies among individual relevant IOCs and can concentrate on resolving reported incidents. One or more embodiments may be applied on top of multiple security devices regardless of their type or purpose. This allows intelligent and automatic reasoning about results accumulated across all possible detection systems that are available. As opposed to conventional systems that only aggregate results and the final reasoning and decision has to be made by a human analyst, one or more embodiments define an additional security level built on top of existing security devices and reasons and decides automatically without any human intervention. IOCs acquired from multiple diverse devices allow the system to fully reconstruct an attack vector, as the network behavior profile may be combined with a system log activity and other types of monitoring. Incidents created based on IOCs combined from multiple devices are more convincing and easier to confirm by a security administrator. One or more embodiments may be used to integrate existing security devices into a collaborative security system, where findings of one security device are supported or disputed by other devices from various perspectives. The integrated system significantly increases the overall efficacy and decreases costs associated with manual analysis. With more information available, the time needed to confirm a security incident may also be reduced.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving at a security analysis device, a plurality of indicators of compromise (IOCs) associated with an entity, said IOCs based on a system event, network traffic classification, or malware artifact, wherein said IOCs are received from a plurality of security devices, the security analysis device operable to process and analyze said IOCs;
sorting at the security analysis device, said IOCs based on a time of occurrence of each of said IOCs;
creating a representation of transitions between said IOCs at the security analysis device, wherein creating a representation of transitions comprises aggregating said IOCs related to an entity and computing transitions for pairs of IOCs, wherein computing comprises creating a transition matrix computed separately for each entity, wherein rows and columns of the matrix correspond to individual IOCs;
generating at the security analysis device, a feature vector representing inner dependencies among the IOCs for the entity based on said representation of transitions, said representation of transitions describing individual transitions and inner dependencies among the indicators to reconstruct a possible attack vector; and
transmitting said feature vector to a classifier, said feature vector configured for use by the classifier in identifying malicious entities.

2. The method of claim 1 wherein sorting said IOCs comprises sorting said IOCs in a chain comprising first-order transitions.

3. The method of claim 2 wherein said feature vector comprises a binarized feature vector.

4. The method of claim 1 wherein sorting said IOCs comprises chaining said IOCs in multi-order transitions.

5. The method of claim 4 wherein said IOCs are weighted according to a distance between said IOCs in said representation of transitions.

6. The method of claim 1 wherein said representation of transitions comprises a transition matrix.

7. The method of claim 1 wherein receiving said plurality of IOCs comprises receiving said IOCs over time from a security system and further comprising updating said representation of transitions.

8. The method of claim 1 wherein at least two of said plurality of security devices produce different types of said IOCs.

9. The method of claim 1 further comprising utilizing said feature vector to train a data-driven classifier.

10. An apparatus comprising:
an interface for receiving a plurality of indicators of compromise (IOCs) associated with an entity, said IOCs based on a system event, network traffic classification, or malware artifact, wherein said IOCs are received from a plurality of security devices, the security analysis device operable to process and analyze said IOCs;
a processor for sorting said IOCs based on a time of occurrence of each of said IOCs, creating a representation of transitions between said IOCs, and generating a feature vector representing inner dependencies among the IOCs for the entity based on said representation of transitions, said representation of transitions describing individual transitions and inner dependencies among the indicators to reconstruct a possible attack vector; and
memory for storing said IOCs;
wherein said feature vector is configured for use by a classifier in identifying malicious entities; and
wherein creating a representation of transitions comprises aggregating said IOCs related to an entity and computing transitions for pairs of IOCs, wherein computing comprises creating a transition matrix computed separately for each entity, wherein rows and columns of the matrix correspond to individual IOCs.

11. The apparatus of claim 10 wherein sorting said IOCs comprises sorting said IOCs in a chain comprising first-order transitions and wherein said feature vector comprises a binarized feature vector.

12. The apparatus of claim 10 wherein sorting said IOCs comprises chaining said IOCs in multi-order transitions and wherein said IOCs are weighted according to a distance between said IOCs in said representation of transitions.

13. The apparatus of claim 10 wherein said representation of transitions comprises a transition matrix.

14. The apparatus of claim 10 wherein receiving said plurality of IOCs comprises receiving said IOCs over time from a security system and wherein the processor is operable to update said representation of transitions.

15. The apparatus of claim 10 wherein receiving said plurality of IOCs comprises receiving said IOCs from a plurality of security devices, at least two of said plurality of security devices configured to produce different types of said IOCs.

16. The apparatus of claim 10 wherein the memory comprises a database of said IOCs received from a plurality of diverse security devices.

17. Logic encoded on one or more non-transitory computer readable media, wherein the logic is executed to:
process a plurality of indicators of compromise (IOCs) associated with an entity, said IOCs received from multiple security devices, at least two of the security devices operable to produce different types of said IOCs, said IOCs based on a system event, network traffic classification, or malware artifact, wherein said IOCs are received from a plurality of security devices, the security analysis device operable to process and analyze said IOCs;
sort said IOCs based on a time of occurrence of each of said IOCs;
create a representation of transitions between said IOCs; and
generate a feature vector representing inner dependencies among the IOCs for the entity based on said representation of transitions, said representation of transitions describing individual transitions and inner dependencies among the indicators to reconstruct a possible attack vector;
wherein said feature vector is configured for use by a classifier in identifying malicious entities; and wherein said representation of transitions comprises an aggregation of said IOCs related to an entity and transitions are computed for pairs of IOCs by creating a transition matrix computed separately for each entity, wherein rows and columns of the matrix correspond to individual IOCs.

18. The logic of claim 17 wherein said feature vector is used to train a data-driven classifier.

19. The logic of claim 17 wherein said representation of transitions comprises a transition matrix, said feature vector formed from said transition matrix.

\* \* \* \* \*